United States Patent
Lesaffre et al.

(10) Patent No.: US 10,111,289 B2
(45) Date of Patent: Oct. 23, 2018

(54) LIGHT MODULE FOR A LIGHT DEVICE OF A MOTOR VEHICLE AND ASSOCIATED METHOD

(71) Applicant: Valeo Vision, Bobigny (FR)

(72) Inventors: Olivier-Sebastien Lesaffre, Pantin (FR); Marc Duarte, Villemomble (FR); Etienne Monchy, Herblay (FR); Arnaud Faivre, Paris (FR); Christophe Cros, Nanterre (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/161,559

(22) Filed: May 23, 2016

(65) Prior Publication Data

US 2017/0006670 A1     Jan. 5, 2017

(30) Foreign Application Priority Data

May 26, 2015   (FR) ..................................... 15 54709

(51) Int. Cl.
| | | |
|---|---|---|
| *B60Q 1/30* | (2006.01) | |
| *H05B 33/08* | (2006.01) | |
| *H05B 37/02* | (2006.01) | |
| *B60Q 1/14* | (2006.01) | |
| *B60Q 1/34* | (2006.01) | |

(52) U.S. Cl.
CPC ......... *H05B 33/083* (2013.01); *B60Q 1/1415* (2013.01); *B60Q 1/34* (2013.01); *H05B 33/0809* (2013.01); *H05B 37/0254* (2013.01); *B60Q 2400/30* (2013.01)

(58) Field of Classification Search
CPC ...... B60Q 1/1415; B60Q 1/34; H05B 33/083; H05B 33/0809; H05B 37/0254
USPC ............... 315/82, 83; 362/526, 516, 37, 276
See application file for complete search history.

(56) References Cited

U.S. PATENT DOCUMENTS

| | | | |
|---|---|---|---|
| 6,717,376 B2 * | 4/2004 | Lys .......................... | B60Q 1/26 315/292 |
| 7,385,359 B2 * | 6/2008 | Dowling .................. | B60Q 1/26 315/292 |
| 2009/0051506 A1 * | 2/2009 | Hicksted .............. | B60Q 1/2611 340/332 |
| 2011/0260617 A1 * | 10/2011 | Tanaka .............. | H02M 3/33507 315/82 |
| 2013/0320850 A1 * | 12/2013 | Nakamura .......... | F21S 48/1747 315/82 |
| 2014/0028200 A1 * | 1/2014 | Van Wagoner .... | H05B 37/0272 315/158 |

(Continued)

FOREIGN PATENT DOCUMENTS

DE   102012201415 A1   8/2013

*Primary Examiner* — Douglas W Owens
*Assistant Examiner* — Syed M Kaiser
(74) *Attorney, Agent, or Firm* — Oblon, McClelland, Maier & Neustadt, L.L.P.

(57) ABSTRACT

A light module for a light device of a motor vehicle. The module according to the invention comprises driving means for the electrical power supply of at least one light source mounted as a load of the driving means and further comprises switching means capable of selectively short-circuiting at least one of the light sources of the module. The invention relates also to a method allowing for the selective short-circuiting of at least one light source of a light module according to the invention.

20 Claims, 2 Drawing Sheets

(56) References Cited

U.S. PATENT DOCUMENTS

| | | | |
|---|---|---|---|
| 2014/0078767 A1* | 3/2014 | Oguchi | F21S 48/2212 362/516 |
| 2015/0069906 A1* | 3/2015 | Niedermeier | H05B 33/0803 315/77 |
| 2015/0264754 A1* | 9/2015 | Ito | H05B 33/083 315/83 |
| 2015/0351176 A1* | 12/2015 | Hafner | H05B 33/083 315/82 |
| 2015/0353001 A1* | 12/2015 | Fukui | B60Q 1/04 315/82 |
| 2016/0021712 A1* | 1/2016 | Nakamura | H05B 33/0809 315/82 |
| 2016/0096467 A1 | 4/2016 | Murakami et al. | |
| 2016/0121783 A1* | 5/2016 | Takagimoto | B60Q 11/005 315/82 |

* cited by examiner

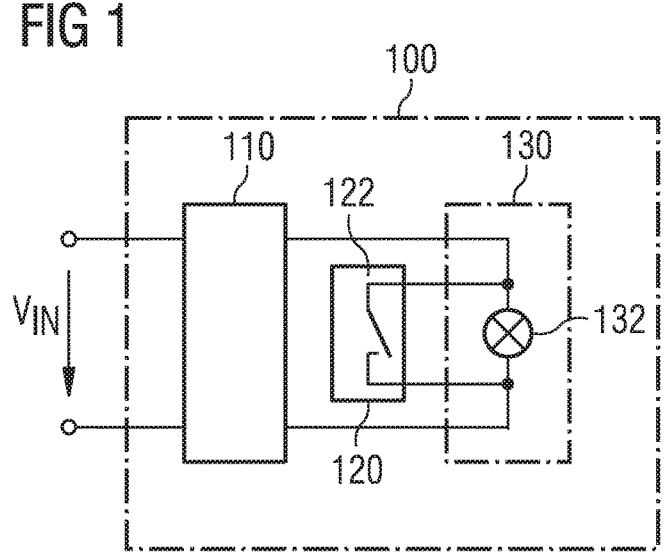
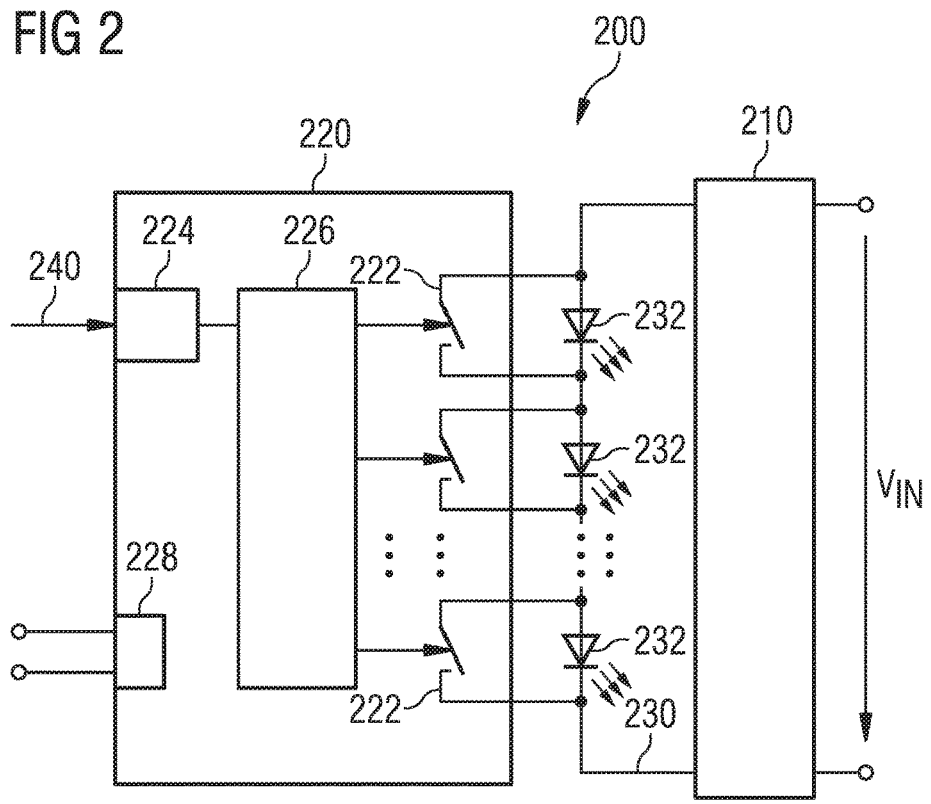

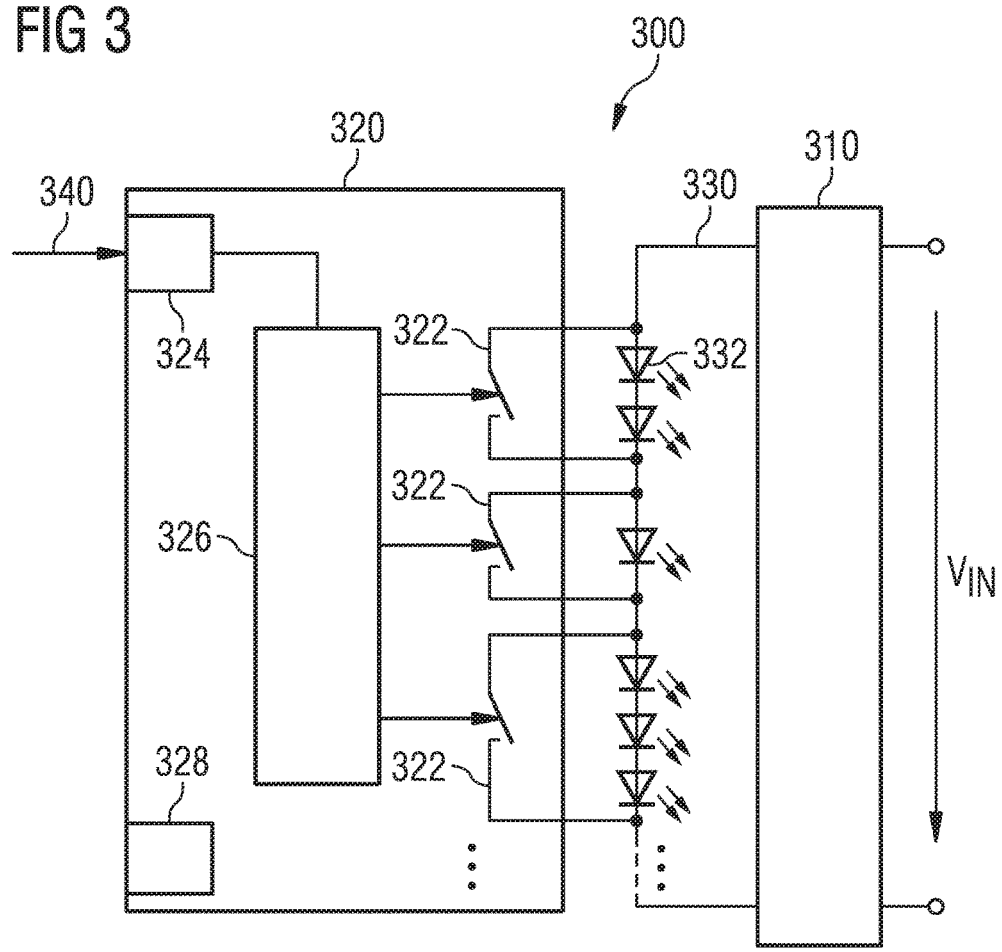

LIGHT MODULE FOR A LIGHT DEVICE OF A MOTOR VEHICLE AND ASSOCIATED METHOD

CROSS-REFERENCE TO RELATED APPLICATIONS

This application claims priority to the French application 1554709 filed May 26, 2015, which applications are incorporated herein by reference and made a part hereof.

BACKGROUND OF THE INVENTION

1. Field of the Invention

The invention deals with the field of light devices for motor vehicles. In particular, the invention relates to a light module which comprises a set of light sources, subsets of which can be switched on or off according to the required light function.

2. Description of the Related Art

A light or lighting device of a motor vehicle generally makes it possible to implement one or more light functions. They can be for example daytime running lamp (DRL) functions, headlights (HL), position lights or turn indicators (TI). Different light intensities are required according to the function.

It is common practice to use light-emitting diodes, LEDs, to implement one or more light functions of a motor vehicle. A light-emitting diode, LED, is an electronic component capable of emitting light when it is passed through by an electrical current. The light intensity emitted by an LED is generally dependent on the intensity of the electrical current which passes through it. The use of LEDs makes it possible to produce original optical signatures when designing motor vehicle lighting devices. Since a light function is often produced by a plurality of LEDs, it is becoming possible to propose a module to produce a number of functions. For example, by switching on only half of the available LEDs, it is possible to produce a light that is less intense than if all of the available LEDs are switched on. Similarly, scrolling lights, which involve a sequential and predefined switching on of LEDs arranged physically along a predefined curve, can be produced.

It is known practice in the art to use a driving circuit to drive the power supply for one or more LEDs. The circuit defines the current which passes through a branch mounted as a load and comprising the group of LEDs connected in series. It is also known practice to use a dedicated driving circuit for each of a plurality of LEDs of a light device. In this way, it becomes possible to drive each of the LEDs independently of the other LEDs of the light device. This solution presents the drawback of being costly since it requires a plurality of identical driving circuits to be implemented. In addition, such an approach does not allow for scale factoring, since the device has to be completely re-adapted and redesigned if a parameter of the light device, for example the number of LEDs used, is changed.

Alternatively, it is also known practice to incorporate switches in the driving circuit which make it possible to short-circuit one or more LEDs connected as load. Short-circuiting a group of LEDs involves diverting the load current, which bypasses the group concerned without switching on the LEDs which form part thereof. Such an architecture makes it possible to switch on or switch off groups of LEDs out of a plurality of LEDs independently by acting on the switches. However, this approach also presents drawbacks since it requires a new design of the driving circuit each time the number of LEDs used in a light device changes.

SUMMARY OF THE INVENTION

The aim of the invention is to propose a light module and a method for short-circuiting at least one light source of a light module according to the invention, that mitigates at least one of the drawbacks of the prior art. Another aim of the invention is to propose a light device comprising at least one light module according to the invention.

The subject of the invention is a light module for a light device of a motor vehicle. The module comprises at least one electronic circuit branch comprising a plurality of light sources, driving means for the electrical power supply of at least one light source of the branch which is mounted as a load of the driving means.

The module is noteworthy in that it further comprises switching means driven independently of the light sources and capable of selectively deactivating at least one of the light sources of the branch.

Preferably, the selective deactivation can be produced by a selective short-circuit.

Advantageously, the driving means, the switching means and the electrical circuit branch each form a unit, the units being mechanically distinct from one another. For example, each unit can be arranged on a distinct support, for example a printed circuit board which is specific to it.

Advantageously, the light module can comprise a power supply channel connecting the driving means to the electrical circuit branch and a control channel connecting the driving means to the switching means, the control channel being distinct from the power supply channel. If necessary, the light module has no control channel directly connecting the driving means to the electrical circuit branch. Control channels should be understood to mean a connection channel, for example a data transmission channel, intended exclusively to convey instructions to activate and/or deactivate light sources of the branch and power supply channels should be understood to be a connection channel intended to exclusively propagate a power supply to the light sources of the branch.

Preferably, the switching means can comprise reception means capable of receiving a signal over a data transmission channel. The switching means can also preferably comprise control means capable of controlling selectively, and being dependent on a signal received by the reception means, the state of at least one switching circuit linked to the terminals of one or more light sources in the load branch. Advantageously, the light sources can be mounted in series in the load branch.

Preferentially, the control means can comprise a microcontroller element. The microcontroller element can be a programmable microcontroller element.

The reception means can preferably be configured to receive and read or decode a signal or message and relay it to the control element. The message can for example instruct the light module to reduce the emitted brightness by half, for example by reducing the duty cycle of the electrical power supply, when all the light sources are powered by a power supply with pulse width modulation, also called PWM. In such an exemplary case, the control means can act in a predetermined manner to deactivate each second light source mounted in series on the load branch. Advantageously, the control element can make use of a switching table stored in a memory element, which correlates each signal that can be received by the reception means with the (open/closed) state of each of the switches. Advantageously, the reception of a specific signal can cause the control means to trigger an automatic switching sequence. For example, the reception of a specific signal can give rise to the sequential deactivation of a number of subsets of light sources of the branch. This can notably make it possible to produce a scrolling light. This architecture notably allows for a reprogramming of the switching means by loading a switching table into the memory element of the control means.

The switching circuits can preferably comprise at least one field-effect transistor, FET. It can be a metal gate field-effect transistor, MOSFET.

The data transmission channel can preferably be a bus of "controller area network", CAN, type, or a bus of "local interconnect network", LIN, type, of a motor vehicle. In this case, the reception means can preferably be means capable of receiving messages of CAN or LIN type respectively.

Preferably, the load branch of the module can comprise a plurality of light sources connected in series.

The load branch can preferentially comprise a parallel arrangement of a number of sub-branches, each of which comprises at least one light source, the light sources of each sub-branch being mounted in series.

The light sources of the module can preferentially comprise light-emitting semiconductor chips, for example light-emitting diodes, LEDs, of high or low power. The LEDs can be single-chip or multi-chip components.

Preferably, the driving means of the module can comprise a converter capable of converting a DC input voltage into a load voltage different from the input voltage. The converter can be of the buck-boost type, of "flyback" type, or for example of "single-ended primary-inductor converter", SEPIC, type.

Another subject of the invention is a light device for a motor vehicle. The device is noteworthy in that it comprises at least one light module according to the invention.

Another subject of the invention is a method for selectively powering one or more light sources of a light device of a motor vehicle. The method is noteworthy in that it comprises the following steps:
  provision of a light module according to the invention;
  selective short-circuiting of at least one of the light sources of the module dependent on a signal received by the control means over a data transmission channel of the motor vehicle.

By virtue of the invention, it becomes possible to use a same driving circuit for the power supply of a number of LEDs for different light devices. The invention proposes dedicated switching means, which operate independently of the driving circuit concerned. The design of the driving circuit and of the switching means can be done independently. Therefore, if the number of LEDs of a new light device increases for example by comparison to a prior embodiment of such a device, the same driving circuit can be re-used. The switching means, which can be produced rapidly and without incurring high development costs, can be scaled by adding additional switches, in order to accommodate the increased number of LEDs powered by the driving circuit.

The invention thus increases the flexibility and reduces the design complexity for light devices for motor vehicles, in particular devices which produce a number of light functions using the same light sources, by powering the latter selectively.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood from the description and the drawings, which are presented only in a manner that is indicative of and nonlimiting on the invention, and in which:

FIG. 1 is a schematic illustration of a preferential embodiment of the system according to the invention;

FIG. 2 is a schematic illustration of a preferential embodiment of the system according to the invention; and FIG. 3 is a schematic illustration of a preferential embodiment of the system according to the invention.

DETAILED DESCRIPTION OF THE PREFERRED EMBODIMENTS

Similar references are used to describe similar concepts through a number of distinct embodiments. For example, the references 100, 200 and 300 describe a light module according to the invention in three distinct embodiments.

The technical characteristics described for a given embodiment are applicable to other embodiments of the invention, unless otherwise stipulated.

FIG. 1 schematically illustrates a light module 100 according to an embodiment of the invention. Such a module is applicable to a light device of a vehicle, and in particular to such a device using a plurality of light sources to produce different light functions, for example daytime running light and headlight functions. The module comprises driving means 110 for the electrical power supply of at least one light source 132. It can, for example, be a driving circuit known to those skilled in the art, which involves a converter which is known per se. Generally, the driving means 110 are powered by a DC voltage source, such as a battery that is not illustrated of a motor vehicle. They are capable of converting the input voltage into a load voltage with a different value. Although the light source 132 is shown as a single component in FIG. 1, a person skilled in the art will understand that it can be a plurality of light sources 132 mounted in series on the load branch 130. Alternatively, the load branch 130 can comprise a parallel arrangement of a number of sub-branches, each of which comprises at least one light source 132.

The light module 100 also comprises switching means 120. The switching means 120 comprise at least one circuit which implements a switching circuit or switch 122. The switch 122 is linked to the terminals either of a light source 132, or of a set of light sources 132 connected in series. When the driving means 110 power the load branch 130 and the switch 122 of the switching means 120 is open, the light sources 132 concerned are powered by electrical current. When the switch 122 is in the closed state, the electrical current which flows in the load branch 130 is diverted and the light sources 132 are excluded from the electrical power supply. The switching means 120 are powered independently of the light sources 132. In particular, the switching means 120 are not powered by the driving means 110.

According to a preferred embodiment of the invention, the driving means 110, the switching means 120 and the load branch 130 are produced on PCBs (print circuit boards) that are physically distinct and linked together by appropriate electrical connection means, for example by bridging. In the embodiments shown in FIGS. 2 and 3 respectively, the light sources 232, 333 are light-emitting diodes, LEDs, either of high or of low power. Such electronic components are known in the art and will not be explained in detail in the context of the present invention. By way of example and in a nonlimiting manner, the PCB implementing the load branch 130 can comprise 5 or 12 LED elements connected in series.

FIG. 2 schematically shows a light module 200 according to an embodiment of the invention. Each of the switches 222 of the switching means 220 is linked to the terminals of one of the LEDs 232 mounted on the load branch 230. A switch 222 therefore makes it possible to short-circuit an LED 232. Each switch 222 can, for example, be implemented by a transistor, such as a field-effect transistor, FET, in particular a metal gate field-effect transistor, MOSFET.

The switching means 220 comprise a control element 226, such as a microcontroller, which preferably comprises processor means and a memory. The control element 226 is preconfigured for it to switch the state of each of the switches 222, to which it is electrically connected, following the reception of a predetermined signal, received by reception means 224. By way of example, the signal can be a message received over a communication bus 240 of the motor vehicle. The reception means 224 are in this case configured to receive and read or decode the message, and relay it to the control element 226. The message can, for example, instruct the light module 200 to reduce the emitted brightness by half, for example by reducing the duty cycle of the electrical power supply, when all the LEDs 232 are powered by a power supply with pulse width modulation, also called PWM. In such an exemplary case, the control means 226 act in a predetermined manner to short-circuit each second LED of the series connection on the load branch 230. Advantageously, the control element 226 makes use of a switching table stored in a memory element, which correlates each signal that can be received by the reception means 224 with the (open/closed) state of each of the switches 222. Advantageously, the reception of a specific signal can cause the control means 226 to trigger an automatic switching sequence. For example, the reception of a specific signal can give rise to the sequential short-circuiting of a number of subsets of LEDs 232 of the branch 230. This notably makes it possible to produce a scrolling light. This architecture notably allows for a reprogramming of the switching means 220 by loading a switching table into the memory element of the control means 226.

The communication bus 240 over which the module 200 receives signals can preferably be a bus of "controller area network", CAN, type, or of "local interconnect network", LIN, type, of a motor vehicle. These architectures are known in the art and will not be described in more detail in the context of the present invention. The reception means 224 are in this case means capable of receiving and of decoding messages of CAN or LIN type respectively. FIG. 2 also shows power supply means 228 which make it possible to electrically power the switching means 220 independently of the electrical power supply for the light sources. Preferably, the power supply means 228 are linked to a current source that is not illustrated of the motor vehicle, such as a battery.

FIG. 3 shows, also schematically, a light module 300 according to an embodiment of the invention. Contrary to the example shown in FIG. 2, the switches 322 are linked to the terminals either of one or two or three LEDs 332 connected in series within the load branch 330. Using the description provided, a person skilled in the art will be able to adapt this architecture to other situations without in any way departing from the scope of the present invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module for a light device of a motor vehicle, said light module comprising:
   at least one electrical circuit branch comprising a plurality of light sources;
   driving circuitry configured to supply electrical power to at least one light source of said at least one electrical circuit branch, the at least one light source being mounted as a load of said driving circuitry; and
   switching circuitry supplied with electrical power independently of said driving circuitry, and the switching circuitry being configured to control, based on a received signal, emission of light from the plurality of light sources by selectively deactivating said at least one light source of said at least one electrical circuit branch, wherein
   said light module has no channel that (i) conveys signals that are based on whether said at least one light source is deactivated and (ii) directly connects said driving circuitry with said switching circuitry.

2. The light module according to claim 1, wherein said switching circuitry comprise
   reception circuitry capable of receiving a signal over a data transmission channel to generate the received signal, and
   control circuitry selectively controlling, based on said signal received by said reception circuitry, a state of at least one switching circuit of the circuitry, said at least one switching circuit being linked to terminals of said at least one light source in said at least one electrical circuit branch.

3. The light module according to claim 2, wherein said control circuitry comprise a microcontroller element.

4. The light module according to claim 2, wherein said at least one switching circuit comprise at least one field effect transistor, FET.

5. The light module according to claim 2, wherein said data transmission channel is a bus of a motor vehicle, the bus being one of a controller area network (CAN) type and a local interconnect network (LIN) type, and said reception circuitry being capable of receiving messages of the CAN type or the LIN type, respectively.

6. The light module according to claim 1, wherein said at least one electrical circuit branch comprises said plurality of light sources connected in series.

7. The light module according to claim 1, wherein
   said at least one electrical circuit branch comprises a parallel arrangement of a number of sub-branches, and
   each of the sub-branches comprises a respective one or more light sources of the plurality of light sources, said at least one light source being said one or more light sources of one of the sub-branches, and, for each of the sub-branches, said one or more light sources of said sub-branch being mounted in series.

8. The light module according to claim 1, wherein said plurality of light sources comprises light-emitting semiconductor chips.

9. The light module according to claim 1, wherein said driving circuitry comprise a converter capable of converting a DC input voltage into a load voltage different from said input voltage.

10. The light module according to claim 1, wherein said light module is mounted in said light device of the motor vehicle, said light device comprising at least one of a headlamp or daytime running lamp.

11. A method for selectively powering one or more light sources of a light device of a motor vehicle, wherein said switching circuitry operates in accordance with the following steps:
providing said light module according to claim 1;
performing the selectively deactivating of said at least one light source by selectively short-circuiting said at least one light source of said light module dependent on said received signal, which is received by control circuitry of said switching circuitry, the received signal being received over a data transmission channel of said motor vehicle.

12. The light module according to claim 3, wherein said at least one switching circuit comprise at least one field effect transistor, FET.

13. The light module according to claim 3, wherein said data transmission channel is a bus of a motor vehicle, the bus being one of a controller area network (CAN) type and a local interconnect network (LIN) type, and in that said reception circuitry are capable of receiving messages of the CAN type or the LIN type respectively.

14. The light module according to claim 4, wherein said data transmission channel is a bus of a motor vehicle, the bus being one of a controller area network (CAN) type and a local interconnect network (LIN) type, and in that said reception circuitry are capable of receiving messages of the CAN type or the LIN type respectively.

15. The light module according to claim 2, wherein said at least one electrical circuit branch comprises said plurality of light sources connected in series.

16. The light module according to claim 4, wherein said at least one electrical circuit branch comprises said plurality of light sources connected in series.

17. The light module according to claim 5, wherein said at least one electrical circuit branch comprises said plurality of light sources connected in series.

18. The light module according to claim 2, wherein
said at least one electrical circuit branch comprises a parallel arrangement of a number of sub-branches, and
each of the sub-branches comprises a respective one or more light sources of the plurality of light sources, said at least one light source being said one or more light sources of one of the sub-branches, and, for each of the sub-branches, said one or more light sources of said sub-branch being mounted in series.

19. The light module according to claim 2, wherein said plurality of light sources comprises light-emitting semiconductor chips.

20. A light module for a light device of a motor vehicle, the light module comprising:
at least one electrical circuit branch comprising a plurality of light sources;
driving means that supplies electrical power to at least one light source of the at least one electrical circuit branch, the at least one light source being mounted as a load of the driving means; and
switching means being supplied with electrical power independently of the driving means, and the switching means being configured to control, based on a received signal, emission of light from the plurality of light sources by selectively deactivating the at least one light source of the at least one electrical circuit branch, wherein
the light module has no channel that (i) conveys signals that are based on whether said at least one light source is deactivated and (ii) directly connects said driving means with said switching means.

* * * * *